Patented Oct. 8, 1946

2,409,174

UNITED STATES PATENT OFFICE 2,409,174

LUMINESCENT MATERIALS

Herbert J. Dietz, Rochester, N. Y., assignor to Eastman Kodak Company, Rochester, N. Y., a corporation of New Jersey No Drawing. Application May 2, 1944, Serial No. 533,802

5 Claims. (Cl. 252—301.4)

This invention relates to improvements in the making of a barium fluorhalide luminophor as covered by my Patent No. 2,303,917, granted December 1, 1942, and also in Patent No. 2,303,963, granted December 1, 1942, to Otto Uhle, or in the co-pending application, Serial No. 496,488, filed July 28, 1943, by Otto D. Uhle, which discloses the making of a barium fluorobromide luminophor by the firing together of barium fluoride and barium bromide.

In the examples given in the above patents and application barium or strontium halide, such as a chloride or a mixture of bromide or chloride with fluoride, is heated with an alkali halide such as potassium or sodium fluoride or chloride, the latter acting as a flux, at temperatures between 1100° and 1500° F. In every case fluoride and a chloride or bromide are present. The details of practice will be evident from an inspection of the patents.

The specific example given in the Uhle application is in parts by weight:

| | Parts |
|---|---|
| Barium bromide ($BaBr_2.2H_2O$) | 33.3 |
| Barium fluoride ($BaF_2$) | 17.5 |
| Potassium chloride (KCl) | 10 |

A dried mixture of the above in the form of fine crystals is fired at 1400° to 1500° F. for from one to three hours, depending on size of the batch, after which it is slowly cooled and soluble flux washed out by decantation.

I have found that the addition of a small quantity of silicon, especially in the form of silico-fluorides, to the batch enhances the luminescence, both the fluorescence and phosphorescence. This is especially true when the materials contain copper or iron or both, as impurities, with which the silicon forms colorless complexes.

When the firing takes place in two stages, as in Example 2 of my above-mentioned Patent No. 2,303,917, the silicon compound should be added prior to or during the first-stage firing.

In the process there described it was found that the addition of sodium silico-fluoride in an amount equal to four per cent of the sodium fluoride, which contained 0.025 per cent copper, raised the fluorescence of the resulting luminophor from 0.38 to 1.2 and the phosphorescence from 0.25 to 1.38. The units here given are on a purely arbitrary scale based on the brightness of a common luminophor. The same percentages of sodium silico-fluoride, when the sodium fluoride contained 0.06 per cent iron, raised the fluorescence from 0.63 to 1.17 and the phosphorescence from 0.48 to 1.21.

In general any silico-fluoride, and particularly any alkali silico-fluoride, is found highly beneficial when the copper or iron is found as an impurity in any of the ingredients referred to in my patent. Other silicon compounds, such as sodium silicate and silicon dioxide, are also beneficial but not to the same extent as the silico fluorides.

In many known phosphors iron and copper, when present in small quantities either intentionally or as impurities, have acted as activators. In other phosphors these elements act as poisons and their presence has a marked adverse effect on the luminescence. My invention is therefore limited to the use of silicon compounds to counteract their adverse influence in the particular type of luminophor described in the patent and application mentioned.

Since sodium silicon fluoride is frequently present as an impurity, in smaller amounts than are necessary to obtain the desired effect, in sodium fluoride, the amount necessary to be added is variable, but in any event is small. With chemicals sold as chemically pure, which customarily contain about 0.001 percent iron or copper or both, one quarter of one per cent of the silicon fluoride would be sufficient, whereas with technical grades, often containing 0.05 per cent, more than one per cent would be required. I have not found, however, that over three per cent of the entire batch serves any useful purpose, although it does not appear to be injurious. An excess is definitely preferable to a deficiency. Even when the amount of iron or copper present is exceedingly small or even not detectable, the presence of the silicon in some cases has been found to be beneficial and in no cases has been harmful.

It is to be understood that the materials, times, temperatures, and other details of the processes outlined in the patent and application referred to are to be followed, the essential feature being prolonged treatment at high temperature, e. g., 1450° F., this invention being limited to the inclusion in those processes of the step of adding a silicon compound to increase the luminescence of the resulting product.

Having thus described my invention, what I claim is:

1. A luminescent composition comprising as its principal ingredient a barium fluorhalide which has been heat-treated at a temperature of the order of 1450° and containing at least one quarter of one per cent by weight of a silicon compound selected from the silico fluorides, the silicates and silicon dioxide.

2. In the method of preparing a barium fluorhalide luminophor by subjecting a mixture of barium and alkali fluorides and chlorides to heat treatment, the step of including in the batch a quantity of a silicon compound selected from the silico fluorides, the silicates, and silicon dioxide in an amount greater than one quarter of one per cent and less than three per cent of the batch.

3. In the method of preparing a luminescent barium fluorhalide by subjecting a mixture of barium and alkali fluorides and chlorides to prolonged heat treatment, the step of including in the batch a quantity of a silico-fluoride greater than one quarter of one per cent and less than three per cent of the batch.

4. The method of overcoming the deleterious effects in a barium fluorchloride luminophor resulting from the presence of iron or copper in a batch comprising barium chloride and sodium fluoride from which the luminophor is made by prolonged heat treatment that comprises adding sodium silico-fluoride to the batch prior to the heat treatment in an amount between one quarter of one per cent and three per cent of the batch.

5. In the process of making a barium fluorchloride luminophor by repeated subjection to heat at a temperature of the order of 1450° F. of barium and alkali fluorides and chlorides, the step of adding a silicon fluoride to the batch prior to the first heat treatment in quantities between one quarter of one per cent and three per cent of the batch.

HERBERT J. DIETZ.